United States Patent
Lu et al.

(10) Patent No.: US 9,224,067 B1
(45) Date of Patent: Dec. 29, 2015

(54) SYSTEM AND METHODS FOR DIGITAL ARTIFACT GENETIC MODELING AND FORENSIC ANALYSIS

(71) Applicant: HRL Laboratories, LLC, Malibu, CA (US)

(72) Inventors: Tsai-Ching Lu, Wynnewood, PA (US); Hankyu Moon, Oak Park, CA (US); Gavin D. Holland, Oak Park, CA (US); David L. Allen, Thousand Oaks, CA (US); Aleksey Nogin, Fresno, CA (US); Michael D. Howard, Westlake Village, CA (US)

(73) Assignee: HRL Laboratories, LLC, Malibu, CA (US)

(*) Notice: Subject to any disclaimer, the term of this patent is extended or adjusted under 35 U.S.C. 154(b) by 245 days.

(21) Appl. No.: 13/748,316

(22) Filed: Jan. 23, 2013

Related U.S. Application Data

(60) Provisional application No. 61/589,680, filed on Jan. 23, 2012.

(51) Int. Cl.
*H04L 29/06* (2006.01)
*G06K 9/62* (2006.01)

(52) U.S. Cl.
CPC ............. *G06K 9/6219* (2013.01); *H04L 63/14* (2013.01)

(58) Field of Classification Search
CPC ..................................................... G06F 21/56
USPC ............................................................ 726/25
See application file for complete search history.

(56) References Cited

U.S. PATENT DOCUMENTS

| | | | |
|---|---|---|---|
| 2011/0041179 A1* | 2/2011 | St Hlberg | 726/23 |
| 2012/0079596 A1* | 3/2012 | Thomas et al. | 726/24 |
| 2012/0174227 A1* | 7/2012 | Mashevsky et al. | 726/24 |

OTHER PUBLICATIONS

David Allen, Tsai-Ching Lu, and David Huber. Detecting and analyzing relationships among anomalies, In IEEE Symposium on Visual Analytics Science and Technology (IEEE VAST), Oct. 2009.

David Allen, Hankyu Moon, and Tsai-Ching Lu. Hierarchical random graph for networks with multiple edge attributes. Technical report, HRL, 2009.

Uri Alon. Network motifs: theory and experimental approaches. Nature Reviews Genetics, 8 (6): 450-461, 2007.

Ero Carrera and Gergely Erdélyi. Digital genome mapping—advanced binary malware analysis. In H. Martin, editor, Proceedings of the 15th Virus Bulletin International Conference, pp. 187-197, Chicago, IL, Sep. 2004. Virus Bulletin Ltd.

Yang Chen, Qin Jiang, Swarup Medasani, David Allen, and Tsai-Ching Lu, Activity based video indexing and search, In Proceedings of Mobile Multimedia/Image Processing, Security, and Applications, vol. 7708 of Proceedings of SPIE, Apr. 2010.

(Continued)

*Primary Examiner* — Jason K Gee
(74) *Attorney, Agent, or Firm* — Tope-McKay & Associates

(57) ABSTRACT

Described is a cyber security system for digital artifact genetic modeling and forensic analysis. The system identifies the provenance (origin) of a digital artifact by first receiving a plurality of digital artifacts, each digital artifact possessing features. Raw features are extracted from the digital artifacts. The raw features are classified into descriptive genotype-phenotype structures. Finally, lineage, heredity, and provenance of the digital artifacts are determined based on mapping of the genotype-phenotype structures.

25 Claims, 9 Drawing Sheets

(56) References Cited

OTHER PUBLICATIONS

Jeremiah J Faith, Boris Hayete, Joshua T Thaden, Ilaria Mogno, Jamey Wierzbowski, Guillaume Cottarel, Simon Kasif, James J Collins, and Timothy S Gardner. Large-scale mapping and validation of *Escherichia coli* transcriptional regulation from a compendium of expression profiles PLoS Biology, 5 (1): e8, Jan. 2007.

M. Ghorghescu. An automated virus classification system. In Virus Bulletin conference, 2005.

Leslie Ann Goldberg, Paul W. Goldberg, Cynthia A. Phillips, and Gregory S. Sorkin. Constructing computer virus phylogenies, Journal of Algorithms, 26 (1): 188-208, 1998, ISSN 0196-6774.

Jiawei Han, Mining heterogeneous information networks by exploring the power of links. In Algorithmic Learning Theory, vol. 5808 of Lecture Notes in Computer Science, 2009.

Md. Karim, Andrew Walenstein, Arun Lakhotia, and Laxmi Parida. Malware phylogeny generation using permutations of code. Journal in Computer Virology, 1 (1): 13-23, 2005.

Oleksii Kuchaiev, Tijana Milenkovic, Vesna Memisevic, Wayne Hayes, and Natasa Przulj, Topological network alignment uncovers biological function and phylogeny. Nature Proceedings, 2009.

Qiaozhu Mei and ChengXiang Zhai, Discovering evolutionary theme patterns from text: an exploration of temporal text mining. In KDD '05: Proceedings of the eleventh ACM SIGKDD international conference on Knowledge discovery in data mining, pp. 198-207, New York, NY, USA, 2005, ACM, ISBN 1-59593-135-X.

Roberto Perdisci, Andrea Lanzi, and Wenke Lee, McBoost: Boosting scalability in malware collection and analysis using statistical classification of executables. In ACSAC '08: Proceedings of the 2008 Annual Computer Security Applications Conference: pp. 301-510, Washington, DC, USA, 2008. IEEE Computer Society, ISBN 978-0-7695-3447-3.

Noam Slonim and Naftali Tishby, Document clustering using word clusters via the information bottleneck method. In SIGIR '00: Proceedings of the 23rd annual international ACM SIGIR conference on Research and development in information retrieval, pp. 208-215, New York, NY, USA, 2000, ACM, ISBN 1-58113-226-3.

Sergi Valverde and Ricard V. Solé. Network motifs in computational graphs: A case study in software architecture, Physical Review E, 72 (2): 026107, Aug. 2005. doi: 10.1103/PhysRevE.72.026107.

Changhe Yuan and Tsai-Ching Lu. A general framework for generating multivariate explanations in bayesian networks, In AAAI'08: Proceedings of the 23rd national conference on Artificial intelligence, pp. 1119-1124. AAAI Press, 2008. ISBN 978-1-57735-368-3.

Changhe Yuan, Xiaolu Liu, Tsai-Ching Lu, and Heejin Lim. Most relevant explanation: Properties, algorithms, and evaluations. In Proceeding of the 25th Conference on Uncertainty in Artificial Intelligence (UAI 2009), Montreal, Canada, 2009.

Thomas Zimmermann and Nachiappan Nagappan. Predicting defects using network analysis on dependency graphs, In ICSE '08: Proceedings of the 30th international conference on Software engineering, pp. 531-540, New York, NY, USA, 2008. ACM. ISBN 978-1-60558-079-1.

S. Medasani and R. Krishnapuram,"Detection of the Number of components in Gaussian mixtures using agglomerative clustering." Intl Conf. on Neural Networks, 1997.

U.S. Appl. No. 12/799,618, filed Apr. 27, 2010 and titled "Three-dimensional (3D) object recognition system using region of interest geometric features".

U.S. Appl. No. 12/592,836, filed Dec. 2, 2009 and titled "System for Object Recognition in Colorized Point Clouds".

U.S. Appl. No. 12/644,751, filed Dec. 22, 2009 and titled "Recognizing Geometrically Salient Objects from Segmented Point clouds Using Strip Grid Histograms".

U.S. Appl. No. 12/685,495, filed Jan. 11, 2010 titled "Grammar Based Cueing Method of Object Recognition and a System for Performing Same".

U.S. Appl. No. 12/644,349, filed Dec. 22, 2009 titled "Strip Histogram Grid for Efficient Segmentation of 3D Pointclouds from Urban Enviroments".

\* cited by examiner

SYSTEM AND METHODS FOR DIGITAL ARTIFACT GENETIC MODELING AND FORENSIC ANALYSIS

CROSS-REFERENCE TO RELATED APPLICATIONS

This is a non-provisional patent application of U.S. Provisional Application No. 61/589,680, filed on Jan. 23, 2012, entitled, "System and Methods for Digital Artifact Genetic Modeling and Forensic Analysis."

BACKGROUND OF THE INVENTION (1) Field of Invention

The present invention relates to a cyber security system and, more particularly, to a cyber security system capable of automatic, fast, and accurate identification of cyber attackers and their weapons from evidence left behind through forensic analysis of digital artifacts.

(2) Description of Related Art

Cyber security has become an increasingly important issue in the modern digital world. One important aspect to address the problem of cyber security is to identify and infer connections between objects involved in attacks (e.g. suspicious events, resources, victims, suspects), and to manage dynamic information for use in predicting intents and actions forensically. Modeling and analyzing such relations has recently emerged in the field of network science, data mining and malware analysis. The sheer volume of raw audit data generated by conventional system and network monitors almost precludes the deployment of intelligent sensors that not only have programmed knowledge models for the systems they are monitoring, but also some method of learning new models to adapt to changes in context or observed attack vectors. Moreover, attacker attribution, the process of establishing concrete relationships between suspects and the evidence they leave behind, is extremely difficult. While attacks may share significant similarities, it may be difficult to correlate a known (and attributed) attack to a newly observed attack based, for example, solely on comparison of temporally ordered events.

Review of evidence left behind is a form of forensic analysis that is typically associated with criminal actions. Such actions can be applied to cyber security analysis using phylogenomic theories. In other words, digital artifacts, like the humans that create them, contain uniquely identifiable internal codes (genes) and externally visible traits (phenes) that provide clues as to who or what created them (provenance), how they evolve over time (heredity), and how they are related (lineage). Although much of the work on phylogenomics has occurred in the biological domain, a handful of approaches have begun applying that to computer malware.

By way of example, Valverde and Zimmerman have adopted motifs for software analysis and fault prediction, however they were based on relations extracted from the source code and have not been applied to malware or other binary artifacts (see the List of Cited Literature References, Literature Reference Nos. 15 and 18).

Other examples were provided by Carrera, Ghorghescu, and Karim, whom describe that multiple feature relations can be collapsed into a single distance measure to generate binary trees, but they did not explicitly model malware multiple inheritance (see Literature Reference Nos. 4, 7, and 10). Further, although Goldberg demonstrated a primate method of modeling multiple inheritances, there was no demonstration of practical results (see Literature Reference No. 8).

While the aforementioned examples touched on phylogenomic theories, they each exhibit limitations and provide significant gaps that prevent them from being complete solutions. Specifically, the prior art fails to: apply the motif identification and analysis techniques with a star-net schema to process raw features extracted from digital artifacts; identify hierarchical feature distributions from artifact relation network to establish lineage relations; determine heredity by finding shared feature sets using artifact relation network and evolution models; and inferring provenance relations by probabilistic graphical analysis techniques that treat author and development environments as missing/hidden values.

Thus, a continuing need exists for a cyber security system that bridges the aforementioned gaps by providing a complete cyber security system capable of automatic, fast, and accurate identification of cyber attackers and their weapons from evidence left behind through forensic analysis of digital artifacts

SUMMARY OF INVENTION

The present invention relates to a cyber security system for digital artifact genetic modeling and forensic analysis. The system includes one or more processors and a memory. The memory has instructions encoded thereon such that upon execution of the instructions, the one or more processors perform a variety of operations as described herein. For example, the system performs an operation of receiving a plurality of digital artifacts, each digital artifact possessing features. The features are then extracted from the digital artifacts. Thereafter, the features are classified into descriptive genotype-phonotype structures. A lineage, heredity, and provenance of the digital artifacts are determined based on mapping of the genotype-phenotype structures.

In another aspect, in extracting the features from digital artifacts, the system uses a spatial-temporal vocabulary tree to index a large set of features and identify potential relationships between the features.

In yet another aspect, in classifying the features into descriptive genotype-phonotype structures, the system identifies correlations between the extracted features and clusters correlated features into motifs.

Further, in determining a lineage, heredity, and provenance of the digital artifacts, the system further models relations between the digital artifacts as an artifact relation network (ARN), the ARN having nodes and links, such that the nodes represent the digital artifacts, annotated with genotype and phenotype feature vectors, and the links represent similarity relationships between the nodes.

Additionally, in determining a lineage, heredity, and provenance of the digital artifacts, the system further generates a hierarchical artifact network (HAN), the HAN having HAN clusters that provide a hierarchical organization of multiple, dependent relations between the digital artifacts, the HAN clusters having leaf nodes that represent digital artifacts and intermediate nodes that a degree of relatedness among clusters of digital artifacts.

In yet another aspect, in determining a lineage, heredity, and provenance of the digital artifacts, the system further determines lineage between each pair of digital artifacts in the ARN by computing a Kullback-Leibler (KL) divergence of the digital artifacts to estimate an evolution transition, such that if the KL divergence is below a predetermined threshold, the pair of digital artifacts are determined to be of an established ARN lineage relation.

Additionally, in determining a lineage, heredity, and provenance of the digital artifacts, the system further determines heredity relations for each established ARN lineage relation by comparing common features of their respective HAN clusters to identify unique overlapping shared features.

Further, in determining a lineage, heredity, and provenance of the digital artifacts, the system further determines provenance by combing HAN clusters with the ARN lineage relations and heredity relations to estimate missing provenance values.

Finally, the present invention also includes a method and computer program product. The computer program product includes instructions encoded on a non-transitory computer-readable medium, such that upon execution of the instructions, the processor performs the operations listed herein, while the method comprises an act of causing the processor to execute the instructions to perform the listed operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
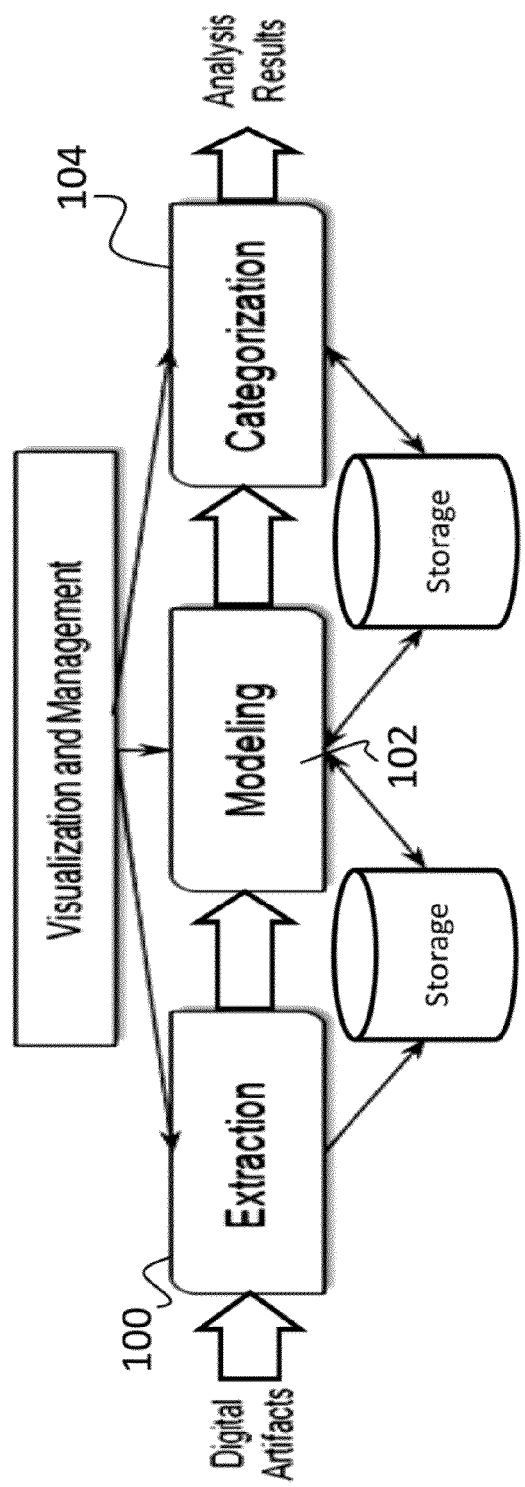
FIG. 1 is a flowchart depicting a process of cyber genetic modeling and forensic analysis tools for digital artifacts.

The present invention relates to a cyber security system and, more particularly, to a cyber security system capable of automatic, fast, and accurate identification of cyber attackers and their weapons from evidence left behind through forensic analysis of digital artifacts. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding, of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited literature references used in the description is provided. Next, a description of various principal aspects of the present invention is provided. Subsequently, an introduction provides the reader with a general understanding of the present invention. Finally, specific details of the present invention are provided to give an understanding of the specific aspects.

(1) List of Cited Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. David Allen, Tsai-Ching Lu, and David Huber. Detecting and analyzing relationships among anomalies. In *IEEE Symposium on Visual Analytics Science and Technology (IEEE VAST)*, October 2009.
2. David Allen, Tsai-Ching Lu, David Huber, and Hankyu Moon. Hierarchical random graph for networks with multiple edge attributes. In *DMIN11, The 7th International Conference on Data Mining*, Jul. 18, 2011.
3. Uri Alon. Network motifs: theory and experimental approaches. *Nature Reviews Genetics*, 8 (6): 450-461, 2007.
4. Ero Carrera and Gergely Erdélyi. Digital genome mapping—advanced binary malware analysis. In H. Martin, editor, *Proceedings of the 15th Virus Bulletin International Conference*, pages 187-197, Chicago, Ill., September 2004. Virus Bulletin Ltd.
5. Yang Chen, Qin Jiang, Swarup Medasani, David Allen, and Tsai-Ching Lu. Activity based video indexing and search, In *Proceedings of Mobile Multimedia/Image Processing, Security, and Applications*, volume 7708 of *Proceedings of SPIE*, April 2010.
6. Jeremiah J Faith, Boris Hayete, Joshua T Thaden, Ilaria Mogno, Jamey Wierzbowski, Guillaume Cottarel, Simon Kasif, James J Collins, and Timothy S Gardner. Large-scale mapping and validation of Escherichia coli transcriptional regulation from a compendium of expression profiles. *PLoS Biology*, 5(1): e8, January 2007.
7. M. Ghorghescu. An automated virus classification system. In *Virus Bulletin conference*, 2005

8. Leslie Ann Goldberg, Paul W. Goldberg, Cynthia A. Phillips, and Gregory B. Sorkin. Constructing computer virus phylogenies. *Journal of Algorithms*, 26 (1): 188-208, 1998. ISSN 0196-6774.
9. Jiawei Han. Mining heterogeneous information networks by exploring the power of links. In *Algorithmic Learning Theory*, volume 5808 of *Lecture Notes in Computer Science*, 2009.
10. Md. Karim, Andrew Walenstein, Arun Lakhotia, and Laxmi Parida. Malware phylogeny generation using permutations of code. *Journal in Computer Virology*, 1 (1): 13-23, 2005.
11. Oleksii Kuchaiev, Tijana Milenkovic, Vesna Memisevic, Wayne Hayes, and Natasa Przulj. Topological network alignment uncovers biological function and phylogeny. *Nature Preceedings*, 2009.
12. Qiaozhu Mei and ChengXiang Zhai. Discovering evolutionary theme patterns from text: an exploration of temporal text mining. In *KDD '05: Proceedings of the eleventh ACM SIGKDD international conference on Knowledge discovery in data mining*, pages 198-207, New York, N.Y., USA, 2005. ACM. ISBN 1-59593-135-X.
13. Roberto Perdisci, Andrea Lanzi, and Wenke Lee. McBoost: Boosting scalability in malware collection and analysis using statistical classification of executables. In *ACSAC '08: Proceedings of the 2008 Annual Computer Security Applications Conference*, pages 301-310, Washington, D.C., USA, 2008. IEEE Computer Society. ISBN 978-0-7695-3447-3.
14. Noam Slonim and Naftali Tishby. Document clustering using word clusters via the information bottleneck method. In *SIGIR '00: Proceedings of the 23rd annual international ACM SIGIR conference on Research and development in information retrieval*, pages 208-215, New York, N.Y., USA, 2000. ACM. ISBN 1-58113-226-3.
15. Sergi Valverde and Ricard V. Solé. Network motifs in computational graphs: A case study in software architecture. Physical Review E, 72 (2): 026107, August 2005. doi: 10.1103/PhysRevE.72.026107.
16. Changhe Yuan and Tsai-Ching Lu. A general framework for generating multivariate explanations in bayesian networks. In *AAAI '08: Proceedings of the 23rd national conference on Artificial intelligence*, pages 1119-1124. AAAI Press, 2008. ISBN 978-1-57735-368-3.
17. Changhe Yuan, Xiaolu Liu, Tsai-Ching Lu, and Heejin Lim. Most relevant explanation: Properties, algorithms, and evaluations. In *Proceeding of the 25th Conference on Uncertainty in Artificial Intelligence (UAI 2009)*, Montreal, Canada, 2009.
18. Thomas Zimmermann and Nachiappan Nagappan. Predicting defects using network analysis on dependency graphs. In *ICSE '08: Proceedings of the 30th international conference on Software engineering*, pages 531-540, New York, N.Y., USA, 2008. ACM. ISBN 978-1-60558-079-1.
19. S. Medasani and R. Krishnapuram, "Detection of the Number of components in Gaussian mixtures using agglomerative clustering," Intl Conf. on Neural Networks, 1997.
20. U.S. patent application Ser. No. 12/799,618 filed Apr. 27, 2010 and titled "Three-dimensional (3D) object recognition system using region of interest geometric features".
21. U.S. patent application Ser. No. 12/592,836 filed Dec. 2, 2009 and titled "System for Object Recognition in Colorized Point Clouds".
22. U.S. patent application Ser. No. 12/644,751 filed Dec. 22, 2009 and titled "Recognizing Geometrically Salient Objects from Segmented Point clouds Using Strip Grid Histograms".
23. U.S. patent application Ser. No. 12/685,495 filed Jan. 11, 2010 titled "Grammar Based Cueing Method of Object Recognition and a System for Performing Same".
24. U.S. patent application Ser. No. 12/644,349 Filed Dec. 22, 2009 titled "Strip Histogram Grid for Efficient Segmentation of 3D Pointclouds from Urban Environments".

(2) Principal Aspects

The present invention has three "principal" aspects. The first is a cyber security system capable of automatic, fast, and accurate identification of cyber attackers and their weapons from evidence left behind through forensic analysis of digital artifacts. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

(3) Introduction

This invention is directed to a system that provides genetic modeling of digital artifacts and that performs analysis to attribute the lineage and inheritance relationships between the artifacts. The system employ methods that are based on the hypothesis that digital artifacts, like the humans that create them, contain uniquely identifiable internal codes (genes) and externally visible traits (phenes) that provide clues as to who or what created them (provenance), how they evolve over time (heredity), and how they are related (lineage).

Key methods developed by the present invention are (1) cyber genetic modeling methods and (2) artifact forensic analysis methods. The cyber genetic modeling methods provide a suite of novel network-based modeling methods that map the features of each artifact into a uniquely descriptive and concise genotype-phenotype structure. Further, the artifact forensic analysis methods provide a suite of novel analysis methods that utilize hierarchical artifact network modeling which clusters over genotype-phenotype structures of artifacts to reason lineage, heredity, and provenance relations between artifacts. Collectively, the methods provide a forensic genetics analysis tool capable of automatic, fast, and accurate identification of cyber attackers and their weapons from evidence left behind in digital artifacts. The tool provides unprecedented analysis capabilities to cyber security by overcoming the current conventional stove-piped approaches to cyber forensics.

The present invention provides several benefits over the prior art. In particular, the tool provides the following advantages:

1. Heredity estimation: Simultaneously optimize dependency relations among genotype and phenotype feature sets of artifacts to estimate their heredity;
2. Lineage estimation: Analyze feature set distributions with missing and superfluous links predictions to reason artifact lineage; and 3. Provenance labeling: Integrate heredity and lineage relations of artifacts to reason and label their provenance (i.e., place or person of origin).

Further details regarding the present invention are provided below.

(4) Specific Details

As shown in FIG. 1, the invention includes three general modules: an extraction module 100, a modeling module 102, and a categorization module 104. The extraction module 100 applies advanced feature extraction techniques to extract raw features from digital artifacts such as binary malwares, images, videos, and texts. The modeling model 102 classifies and analyzes raw features into genes and phenes of digital artifacts and provides effective retrieval for estimating their evolution process and rates. Finally, the categorization module 104 identifies, determines, and inters lineage, heredity, and provenance (origin) of the digital artifacts. Each of these modules and their functions are described in further detail below.

(4.1) Extraction Module—Artifact Feature Extraction

Feature extraction is the process of interrogating and collecting uniquely identifying information (features) from a digital artifact. These features can be thought of as an artifact's raw genetic data, which, after processing and refinement, will constitute its genotype and phenotype. A feature extraction engine is included that classifies the incoming artifacts according to type (e.g., executable, text, image, video), and then passes them to the appropriate extraction module.

Figure 2:
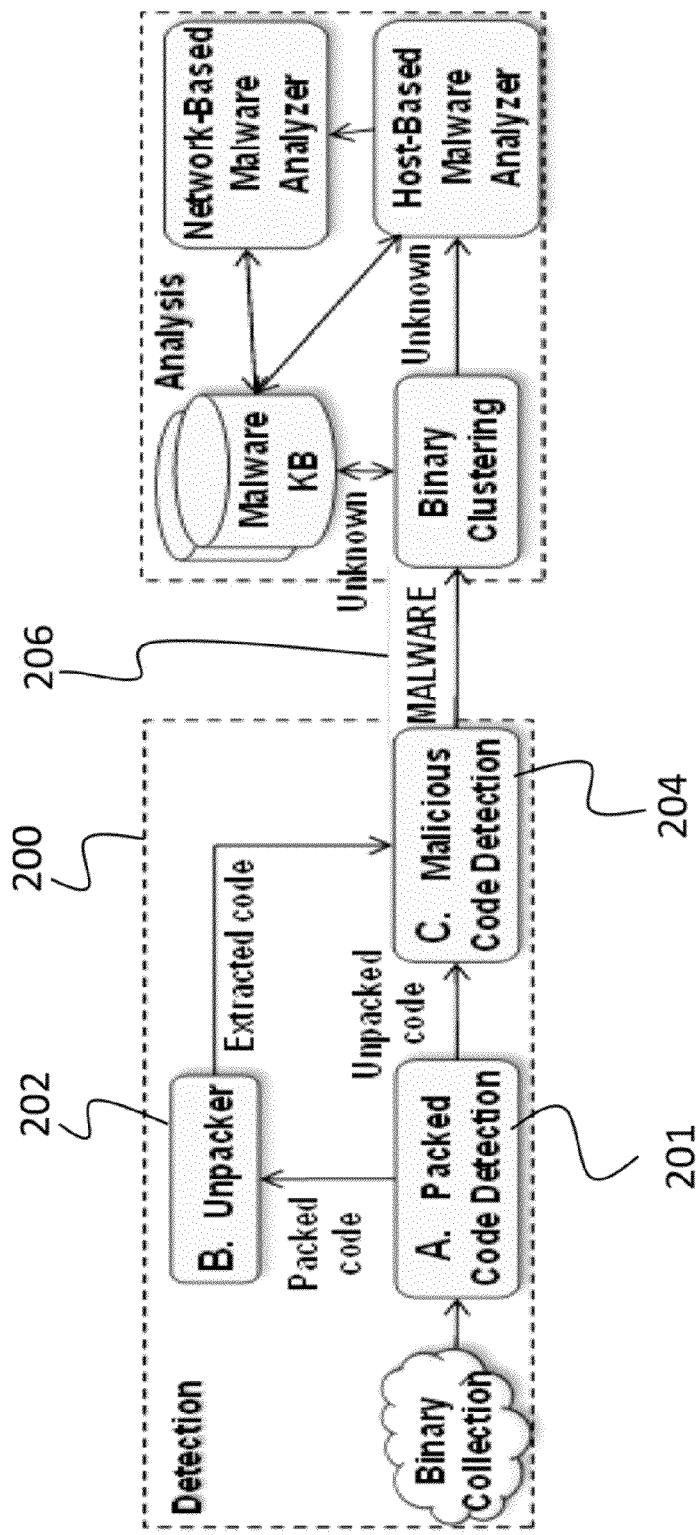
FIG. 2 is an illustration depicting malware feature extraction uses McBoost triage.

Increasingly, malware is obfuscated ("packed"), to defeat current signature-based detection methods. Since unpacking is time-consuming, the present invention uses an online-learning triage front-end to select the optimal analysis method for each incoming malware (e.g., text, image, video, etc). The system employs any suitable triage front-end process to select the optimal analysis method, a non-limiting example of which includes McBoost, as described by Perdisci (see Literature Reference No. 13). As shown in FIG. 2, Mcboost 200 has three modules: a statistical classifier 201 to detect whether an executable is "packed", a universal unpacker 202 (such as Etherunpack) based on dynamic binary analysis, and a classifier for non-packed code 204 to distinguish between malicious and benign programs. Both the statistical classifier 201 and the classifier for non-packed code 204 use n-gram analysis on the binaries but use different sets of heuristics to identify packed code (e.g., high entropy) and malicious code (e.g., frequent occurrences of certain instructions).

The right side of FIG. 2 illustrates how the detected malware 206 is clustered for future uses. For example, the binary of malware will be clustered into malware KB and stored in a database; and both network-based malware and host-based malware analyzers will be used for such clustering.

To extract text features, the system employs any suitable textual feature extraction technique, a non-limiting example of which includes Contextual Probabilistic Latent Semantic Analysis (CPLA) (see Literature Reference No. 12). The CPLA model is capable of analyzing themes, opinions, topics and sources in an integrated manner. The CPLA model treats words as data drawn from a mixture model, with component models for the contextual information distribution and a background word distribution. The CPLA can be estimated using Expectation Maximization to obtain the contextual distribution that forms the basis for all kinds of text analysis. CPLA can be used to (1) discover the global salient themes from the collection of documents; (2) analyze the content variation of the themes in any given view of context; (3) analyze the coverage of themes associated with any given context; (4) discover evolutionary theme patterns and their life cycles; and (5) deduce correlations between text streams by recognizing bursty topic patterns.

To extract image and video features, any suitable image and/or video feature extraction technique may be employed. As a non-limiting example, the present invention uses the method as described in U.S. patent application Ser. No. 12/799,618 (filed Apr. 27, 2010 and titled "Three-dimensional (3D) object recognition system using region of interest geometric features", which is hereby incorporated by reference as though fully set forth herein) to extract candidate features such as windowed optical flow, self-similarity measures, 3D Scale Invariant Feature Transform (SIFT), Gabor filter response, and 3D corners. After extracting the features, the present invention uses a spatial-temporal vocabulary tree to index the large set of features and identify potential relationships which will then be input into artifact relation modeling. Any suitable vocabulary tree may be used, a non-limiting example of which is that described by Chen (see Literature Reference No. 5).

(4.2) Modeling Module—Cyber Genetic Modeling

Given raw features extracted from digital artifacts, the system employs cyber genetic modeling to (1) classify individual features and feature combinations into genotype, phenotype and irrelevant ("noise"); (2) estimate evolution parameters for individual features and species; and (3) infer artifact author's decision making processes in response to global environment changes.

In the context of digital artifacts, there are no a priori definitions of genotype and phenotype. The principles of the present invention apply information theoretic definitions: genotype features are those that carry inheritance information, and phenotype features are those that carry behavioral information e.g., interactions with the environment). Statistical analysis can classify features into genotypes and phenotypes; domain knowledge will increase the accuracy and help eliminate false positives. In this and subsequent analysis steps, the system applies entropy measurements to graphs and clusters that the algorithms consume and produce.

The system identifies hidden correlations between the raw extracted features and stores them as higher-level graphical features called motifs (see Literature Reference No. 3). A motif is a set of features that usually appear together, like malware that uses a certain library and also communicates with a certain internet controller. The "information bottleneck" method (see Literature Reference No. 14) is applied to cluster highly correlated raw features into motifs.

Digital artifacts can be related to each other based on any suitable feature, such as shared ideas, source code, binary code, libraries, authors, etc. Different aspects of the same artifact type may have vastly different update cycles and frequencies; for example, in the malware domain the obfuscating techniques and tools typically evolve much more slowly than the payloads. Similarly, different artifact types could have vastly different evolution models. The present invention explores automated and semi-automated ways to extract and refine such models by learning the genotype and phenotype changes in the repository population. The present invention extends the algorithms described by Kuchaiev (see Literature Reference No. 11) to develop mgFinder for searching motifs in graph-based raw features, such as execution graphs in malware, and to also find motifs between features. MgFinder is an extension of mFinder to the cyber domain, with "mg" representing "motif graph".

mgFinder searches the repository and computes the frequency and conservation ratio of motifs by comparing the fraction of motifs that are found in the data against the fraction of motifs found by chance. The motif frequency distribution over time indicates the trends of motif evolution, and the distribution of motif conservation ratio shows which motifs are pervasive.

Environmental factors can effect artifact evolution (e.g., how market share of various versions of Windows OS or improvement in anti-malware software influence malware evolution) in order to create a more comprehensive and articulate evolution model. The system identifies a set of environmental factors that have the biggest impact on artifact evolution, and then analyzes how artifacts "mutate" in response. Formalisms, such as the Markov Decision Process (MDP), are applied to model how artifact authors make collective decisions to maximize the expected reward given the current environment and limited resources. For malware present invention will use the software process identification framework using (specie, feature)-dependent structure to help formulate the MDP.

(4.3) Categorization Module—Artifact Forensic Analysis

To infer artifact lineage, heredity, and provenance, the system uses the extracted features and defined genotype/phenotype to create a graph of artifact relationships and then applies a series of novel analysis steps to find hierarchical family structures and translate them into lineage, inheritance, and providence relations. The present invention includes two key data structures: (1) Artifact Relation Modeling (ARN) and, (2) Hierarchical Artifact Network (HAN). Described in further detail below are the two data structures and how they are used to infer lineage, heredity, and provenance.

(4.3.1) Artifact Relation Modeling

The system models relations between artifacts as an Artifact Relation Network (ARN), providing analysts and security experts a big picture of the lineage and heredity relationships between a very large (and growing) set of binary artifacts. The challenge is to define and compute distance metrics between artifacts that represent both the similarities between their feature vectors (suggestive of inherited features) and the commonality of those values (how widely used).

Figure 3:
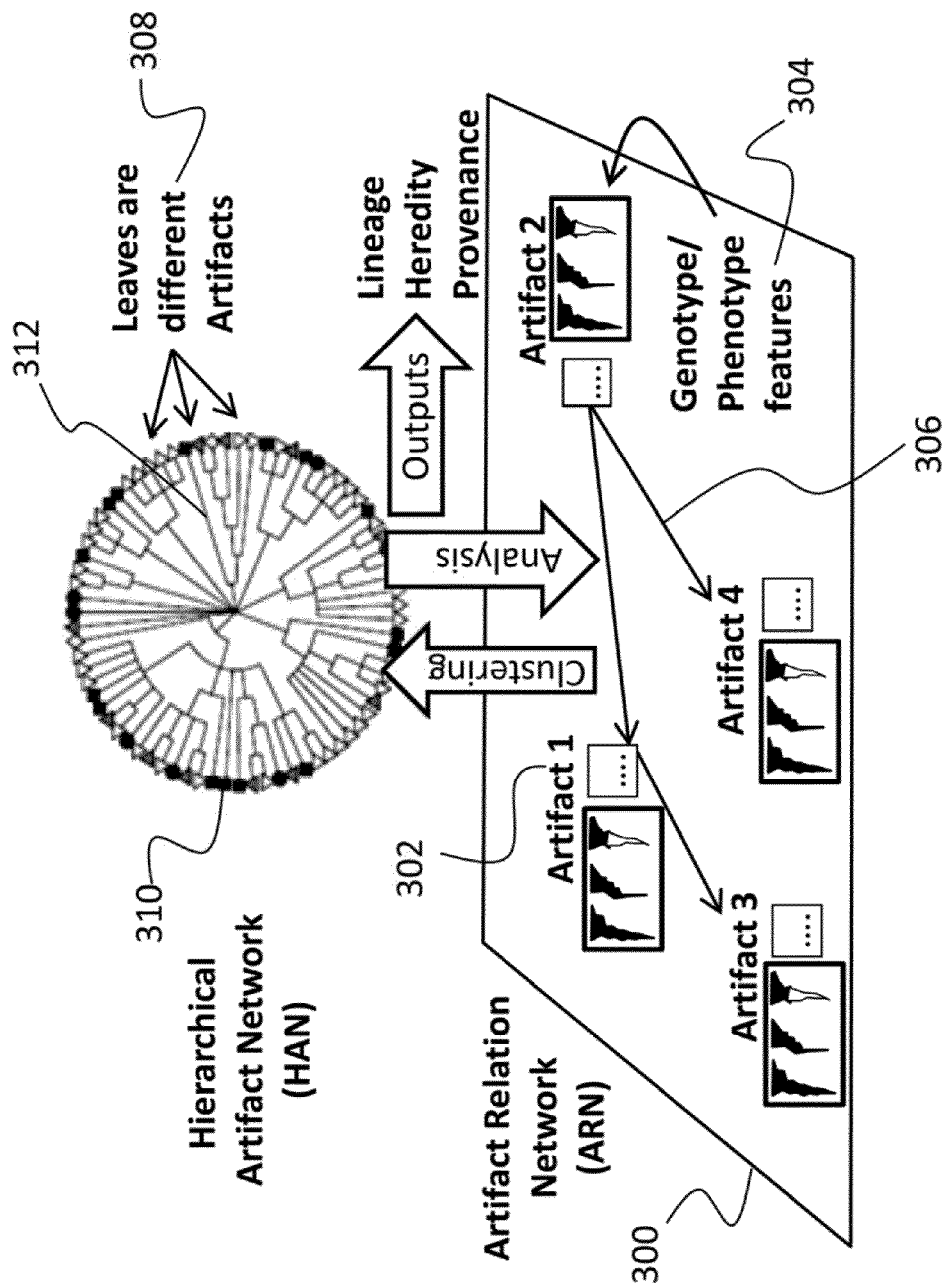
FIG. 3 is an illustration depicting an Artifact Relation Network (ARN) that is clustered into a Hierarchical Artifact Network (HAN), revealing relatedness between artifacts, enabling lineage, heredity and provenance analysis.

As shown in FIG. 3, the ARN 300 is a partially directed graph, where the nodes 302 represent the digital artifacts, annotated with their genotype and phenotype feature vectors 304, and the links 306 represent multiple similarity relationships between them. The direction of the edge is determined when the parent-offspring relations can be automatically verified. The edge strengths of artifact similarities are computed using distance metrics. Edges are links between artifacts (e.g., Artifact1—Artifact2; Artifact2→Artifact4, etc.). Edges are either undirected or directed from one entity (Artifact) to the other.

Figure 4:
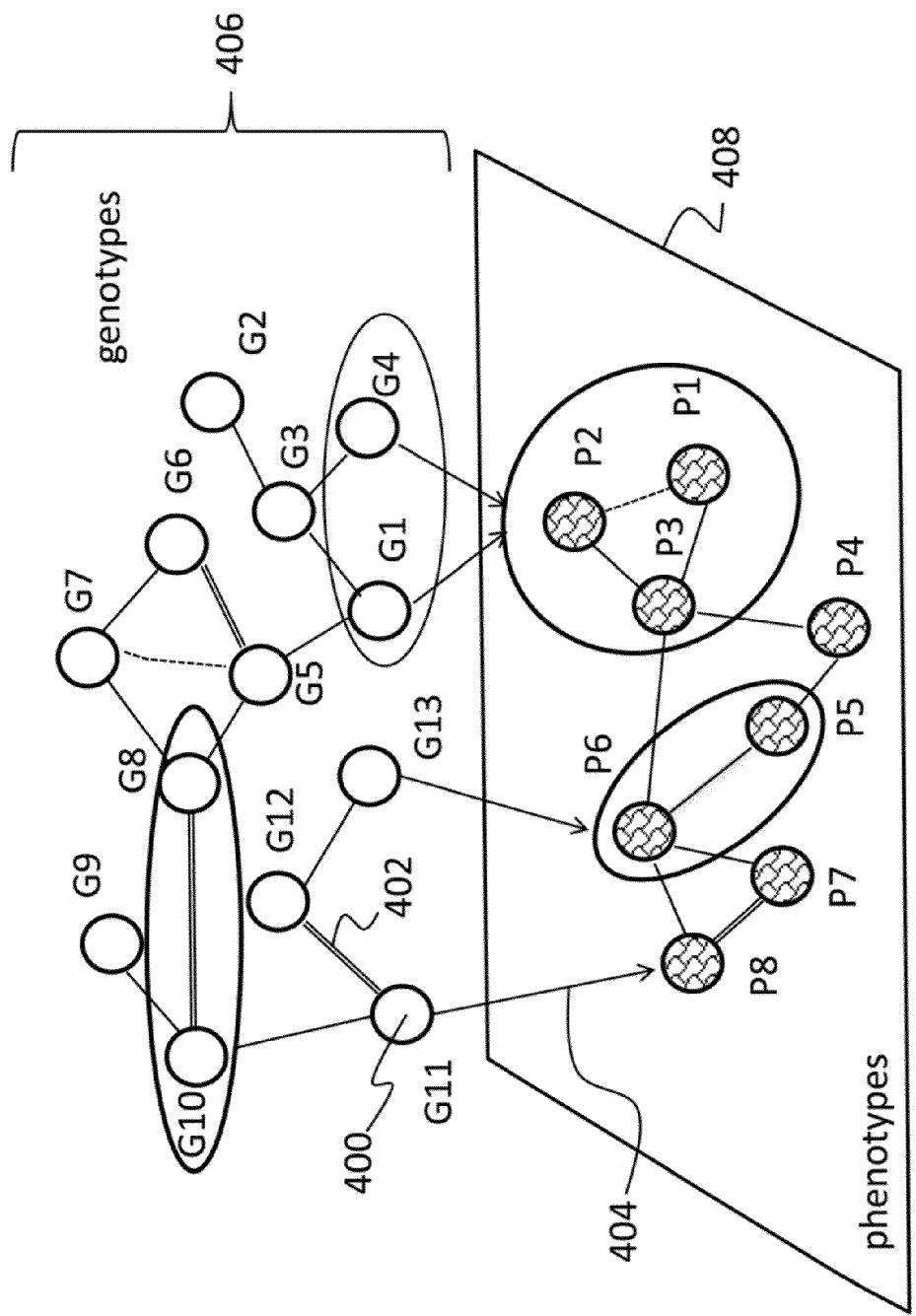
FIG. 4 is an illustration depicting genotype-to-phenotype mapping.

A unique aspect of the ARN construction is computing distance metrics based on dependencies among genotype and phenotype features. As shown in FIG. 4, genotype-phenotype mapping can be used to model such dependencies. For example, features are depicted as nodes 400, with edge shading 402 reflecting association strengths, with directed edges 404 indicating the mapping from a genotype to a phenotype.

In the context of digital artifacts, several genotypes of an artifact may contribute to the expression of a phenotype, or several genotypes of an artifact may depend on each other. The present invention uses network-guided dependency measures, such as the Context Likelihood of Relatedness (CLR) method described by Faith (see Literature Reference No. 6) and adjusted relative risks (NOTE: WHAT IS THIS REFERENCE???) to construct such a mapping. After computing the dependency measures for artifact i and j, the distance metric, $D(i,j)=similarity(i,j)/commonality(i,j)$, gives the ratio of similarity to commonality between artifact and i and j, used in constructing the ARN.

(4.3.2) Hierarchical Artifact Network (HAN)

HAN is a hierarchical organization of multiple, dependent relations between artifacts. For example and as shown in FIG. 3, leaf nodes 308 in the HAN 310 represent artifacts and intermediate nodes 312 in the hierarchy represent the degree of relatedness among clusters of artifacts. HAN is based on Hierarchical Random Graphs (HRG) wHRG for networks with weighted relations (see Literature Reference No. 1) and vHRG for networks having multiple edge weights (multiple, independent similarity relations) (see Literature Reference No. 2).

The present invention includes an algorithm to construct the HAN based on Reversible Jump Markov Chain Monte Carlo (RJMCMC) and its application to Bayesian networks (see Literature Reference Nos. 16 and 17). The RJMCMC algorithm is used with two feature spaces (the space of hierarchical organization and the space of dependency relation) that are optimized at the same time. In this example, the RJMCMC is directly applied with no further extension.

The algorithm simultaneously fits the hierarchical organization and optimizes dependency relations among features. The algorithm removes the requirement that features have to be independent, resulting in a HAN that better captures uncertainty in the feature space as well as membership assignments for constructing hierarchical clusters.

(4.3.3) Artifact Lineage Analysis

A problem of artifact lineage analysis is that it is difficult to determine ancestor/descendent relations among artifacts. The present invention incorporates and benefits from any available ground truth authorship (i.e., knowledge that the author borrowed from a previous artifact). Additionally, the present invention uses heuristics, such as the first-detected-time of artifacts, to establish temporal dependency among artifacts (aware that such heuristics can be noisy and biased).

Figure 5:
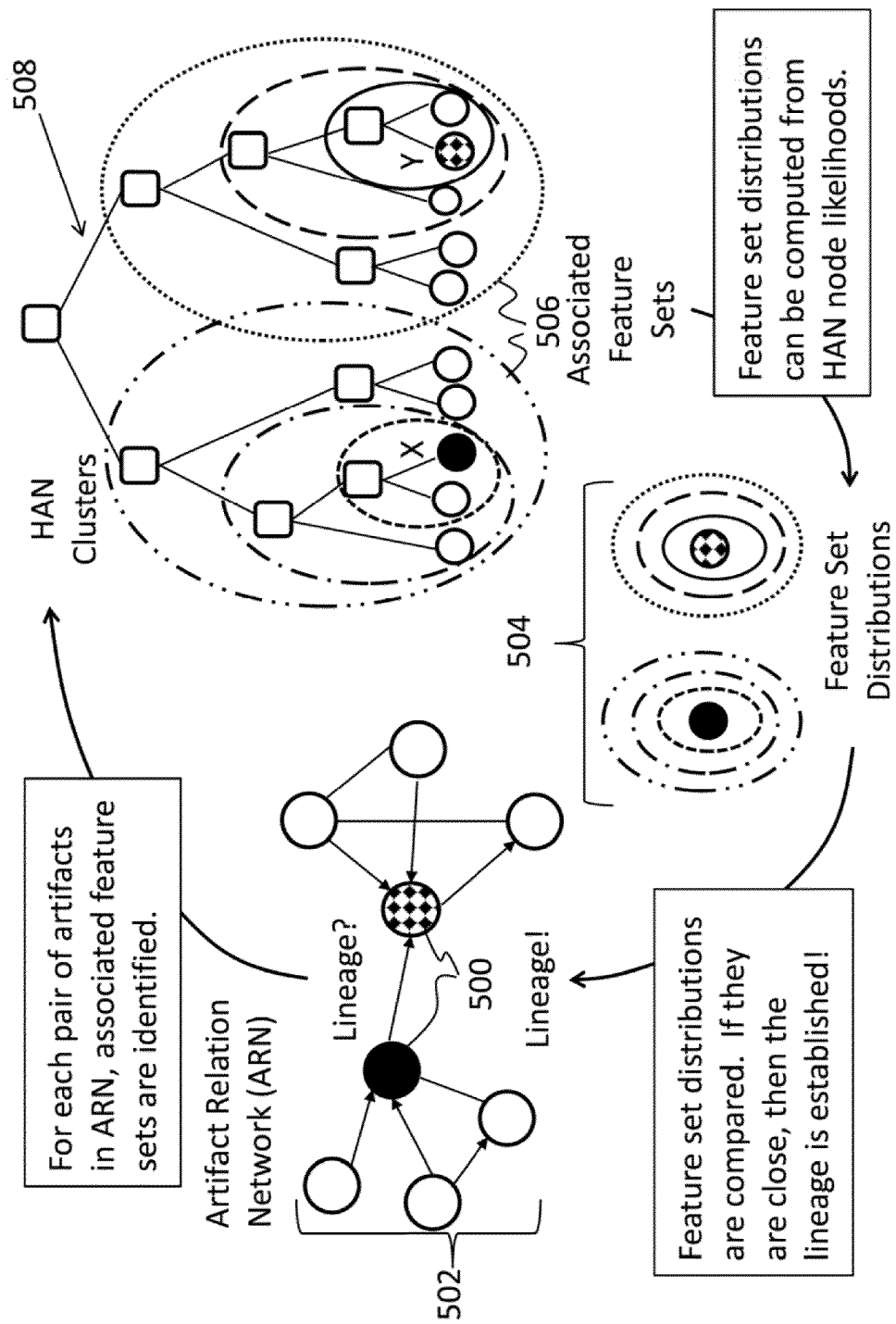
FIG. 5 is an illustration of Lineage Analysis, where the HAN cluster identifies an associated feature set distribution to determine.

As shown in FIG. 5, the system provides a lineage analysis method based on HAN clusters and Kullback-Leibler (KL) divergence together with the heuristics. For each pair of artifact relations 500 in the ARN 502, the system computes the KL divergence to estimate their evolution transition by comparing the distributions 504 of their feature sets 506 in the HAN 508 cluster hierarchy. If the KL divergence is over a specified threshold, the edge is directed by the heuristics. Thus, the invention identifies multiple inheritances, commonly observed in digital artifacts, by checking common set of features found in the HAN cluster hierarchy. The system also removes spurious relations in the ARN, for example, by removing "sibling relations" where two digital artifacts inherited their features from common ancestors but there are no lineage relations between them. The result of the lineage analysis further assists heredity and provenance analysis.

(4.3.4) Artifact Heredity Analysis

The result of lineage analysis provides a basis of identifying which features of a descendant are inherited from its ancestors. For example, if malware B has been evolved from malware A, they may share many similar features (this type of inheritance is referred to as direct feature inheritance). However, some features may be mutated, yet inherited from ancestors. This will be referred to as mutated feature inheritance.

Figure 6:
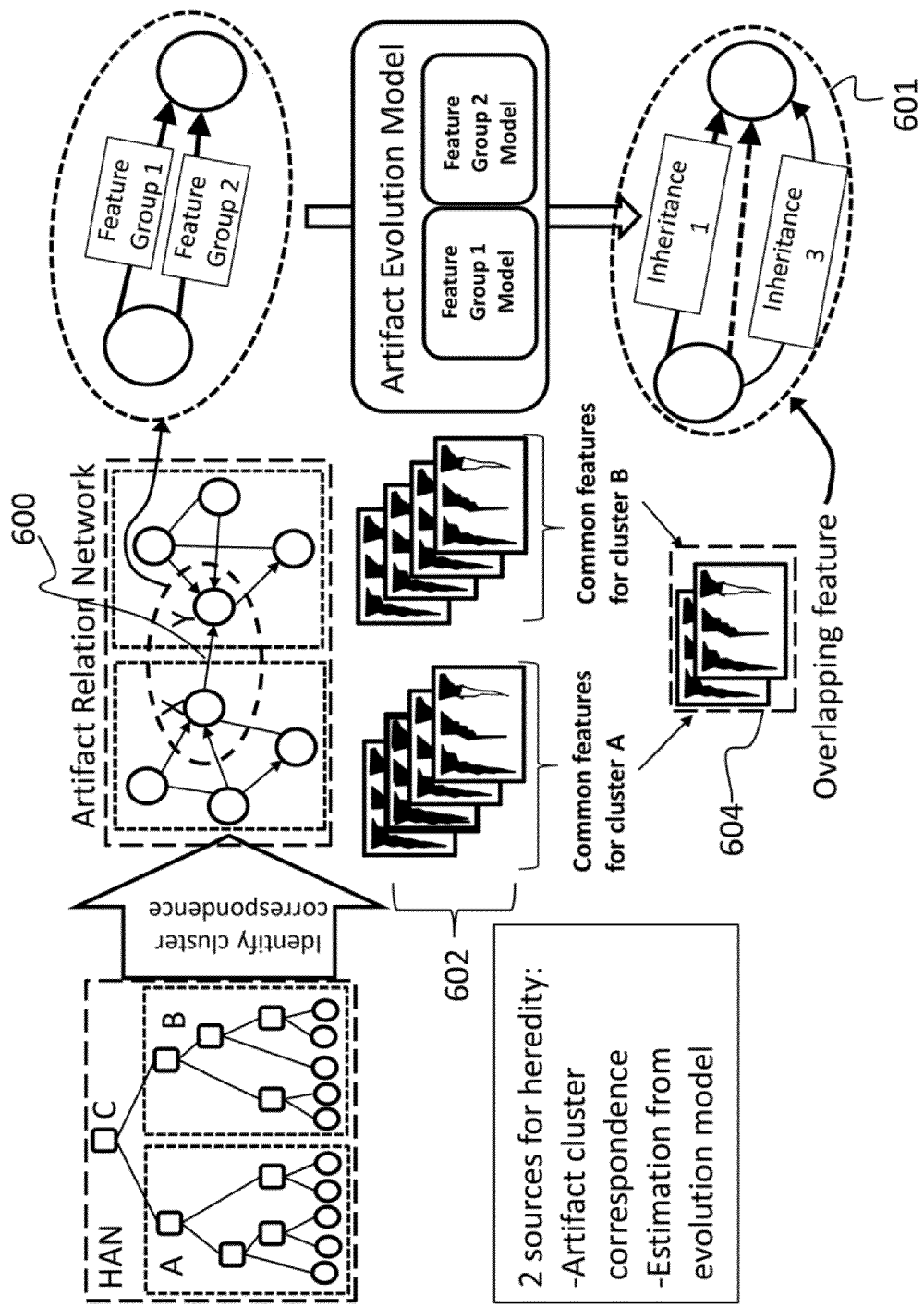
FIG. 6 is an illustration depicting heredity analysis as using hierarchical cluster memberships to discern inherited attribute sets, along with evolution models to determine heredity.

As shown in FIG. 6, the heredity analysis algorithm is developed by identifying direct feature inheritance in the HAN cluster hierarchy and mutated feature inheritance using motif evolution. For each established ARN lineage relation 600, the system identifies direct feature inheritance 601 by comparing the common features 602 of their respective artifact clusters to discern their unique overlapping shared features 604. To identify mutated features, the system compares motifs in feature vectors of ancestor and offspring artifacts. For example, features originated from the same functionality, such as communication, show which feature is mutated.

(4.3.5) Artifact Provenance Analysis

The provenance problem is to infer the authors and development environments of digital artifacts. Although only limited numbers of artifacts have ground truth provenance, the provenance information of most artifacts is buried in their lineage and inheritance relations. For example, if a malware author has a habit of using a certain combination of libraries, this trait is passed down to the next generation of malware. Similarly, a specific development environment will inevitably constrain certain feature inheritance. The membership relations in the HAN cluster hierarchy are another source of information; for example, the artifacts in the same cluster are likely to have similar provenance labels.

Thus, the system includes an analysis algorithm that is developed by framing the problem as inference of missing data and applying an expectation-maximization (EM) algorithm to infer provenance labels. The EM algorithm is commonly understood by one skilled in the art as a way to find the maximum likelihood parameters of a statistical model in cases where the equations cannot be solved directly.

Figure 7:
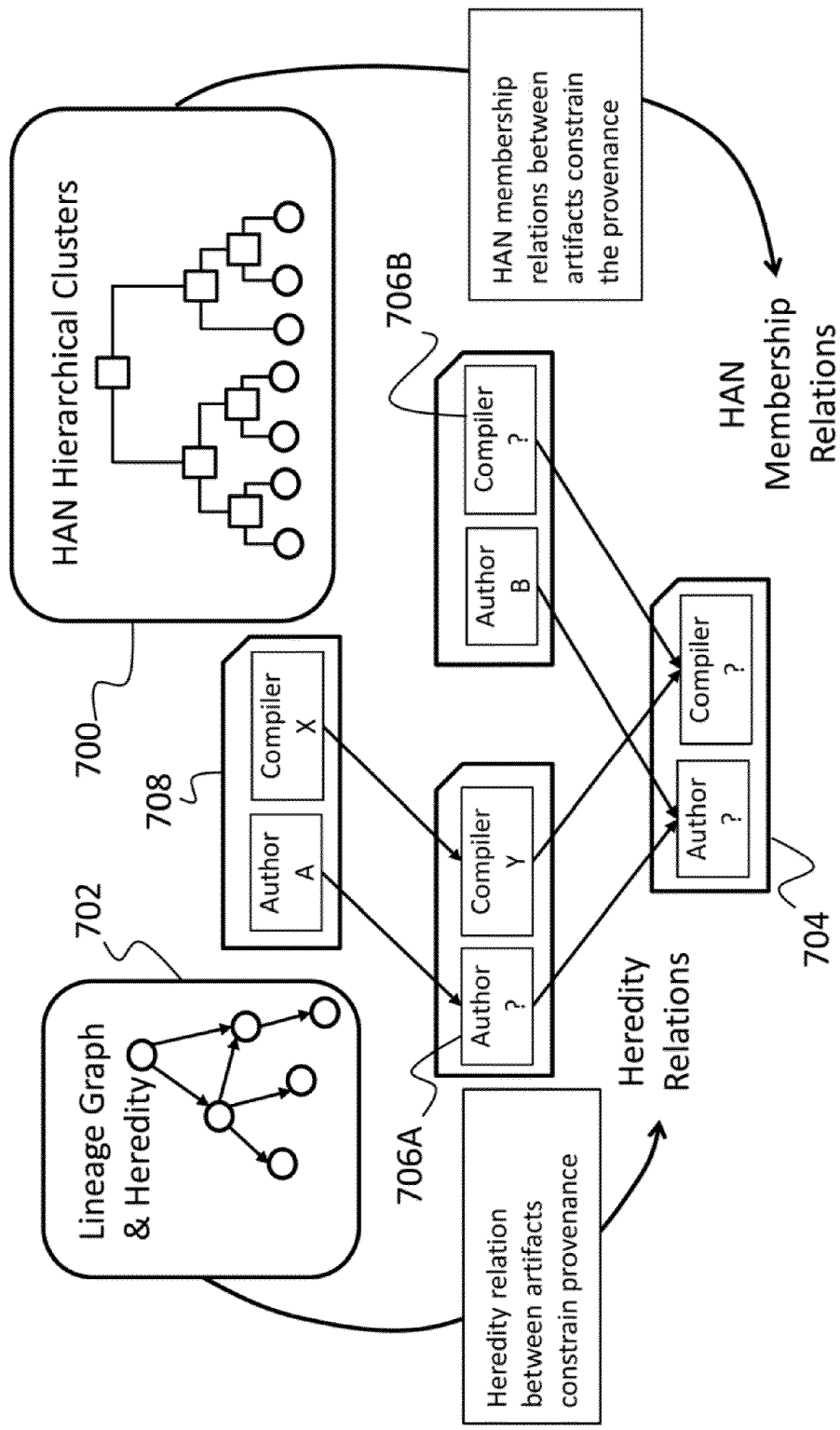
FIG. 7 is an illustration depicting how provenance analysis uses HAN clusters.

As shown in FIG. 7, the system takes the HAN clusters 700 and combines them with the lineage and heredity relations 702 to estimate missing values 704. In doing so, the system first infers the likelihood of the same provenance labels for artifacts in the same HAN clusters, and then infers unknown provenance labels 706A and 706B using the known sets of labels 708 and from lineage and heredity relations 702. The estimated missing values 704 can be generated using any suitable algorithm, a non-limiting example of which includes an evolutionary algorithm.

Figure 8:
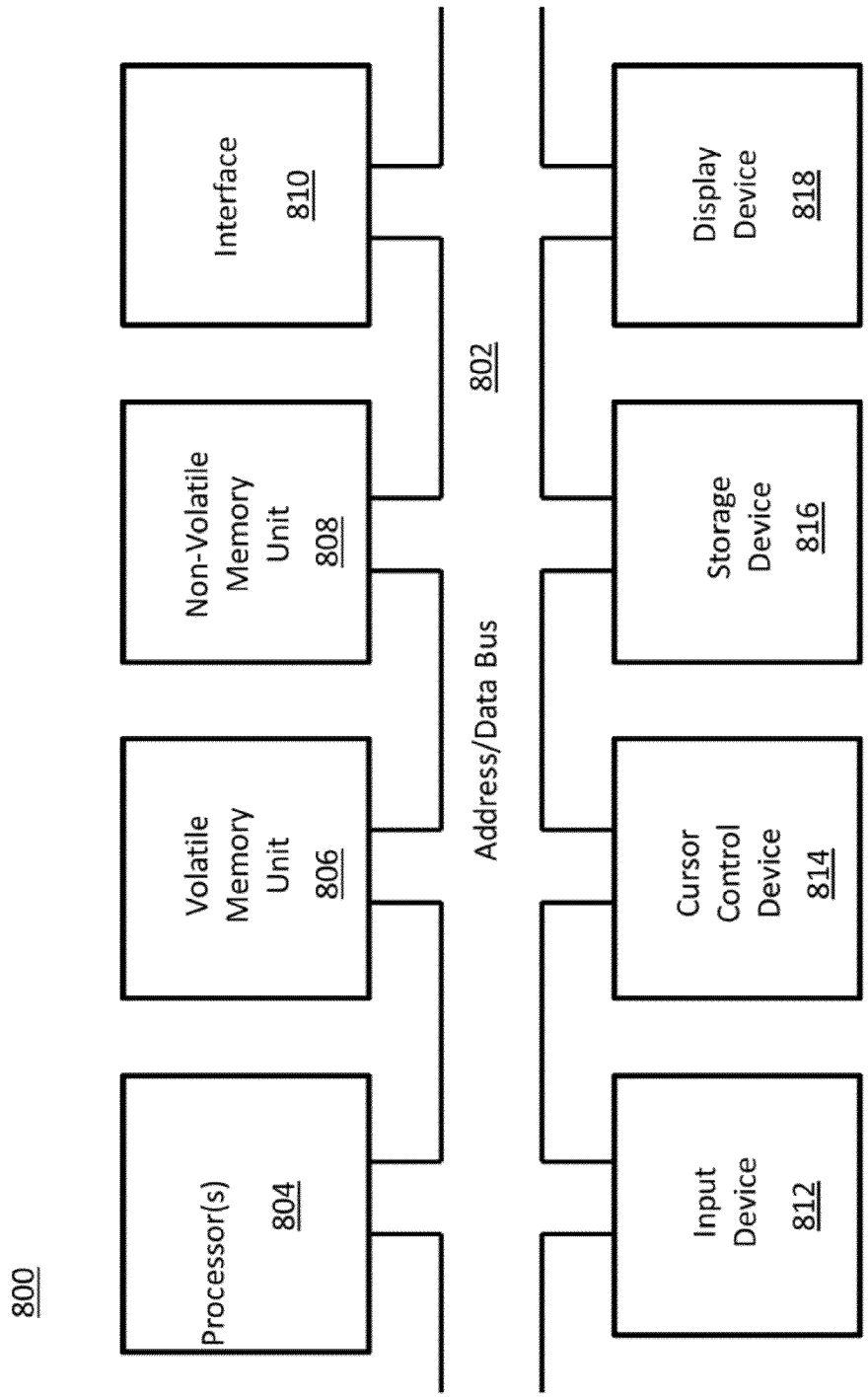
FIG. 8 is a block diagram depicting the components of a cyber security system of the present invention.

A block diagram depicting an example of a system (i.e., computer system 800) of the present invention is provided in FIG. 8. The computer system 800 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 800. When executed, the instructions cause the computer system 800 to perform specific actions and exhibit specific behavior, such as described herein.

The computer system 800 may include an address/data bus 802 that is configured to communicate information. Additionally, one or more data processing units, such as a processor 804 (or processors), are coupled with the address/data bus 802. The processor 804 is configured to process information and instructions. In an aspect, the processor 804 is a microprocessor. Alternatively, the processor 804 may be a different type of processor such as a parallel processor, or a field programmable gate array.

The computer system 800 is configured to utilize one or more data storage units. The computer system 800 may include a volatile memory unit 806 (e.g., random access memory ("RAM"), static RAM, dynamic RAM, etc.) coupled with the address/data bus 802, wherein a volatile memory unit 806 is configured to store information and instructions for the processor 804. The computer system 800 further may include a non-volatile memory unit 808 (e.g., read-only memory ("ROM"), programmable ROM ("PROM"), erasable programmable ROM ("EPROM"), electrically erasable programmable ROM "EEPROM"), flash memory, etc.) coupled with the address/data bus 802, wherein the non-volatile memory unit 808 is configured to store static information and instructions for the processor 804. Alternatively, the computer system 800 may execute instructions retrieved from an online data storage unit such as in "Cloud" computing. In an aspect, the computer system 800 also may include one or more interfaces, such as an interface 810, coupled with the address/data bus 802. The one or more interfaces are configured to enable the computer system 800 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 800 may include an input device 812 coupled with the address/data bus 802, wherein the input device 812 is configured to communicate information and command selections to the processor 800. In accordance with one aspect, the input device 812 is an alphanumeric input device, such as a keyboard, that may include alphanumeric and/or function keys. Alternatively, the input device 812 may be an input device other than an alphanumeric input device. In an aspect, the computer system 800 may include a cursor control device 814 coupled with the address/data bus 802, wherein the cursor control device 814 is configured to communicate user input information and/or command selections to the processor 800. In an aspect, the cursor control device 814 is implemented using a device such as a mouse, a track-ball, a track-pad, an optical tracking device, or a touch screen. The foregoing notwithstanding, in an aspect, the cursor control device 814 is directed and/or activated via input from the input device 812, such as in response to the use of special keys and key sequence commands associated with the input device 812. In an alternative aspect, the cursor control device 814 is configured to be directed or guided by voice commands.

In an aspect, the computer system 800 further may include one or more optional computer usable data storage devices, such as a storage device 816, coupled with the address/data bus 802. The storage device 816 is configured to store information and/or computer executable instructions. In one aspect, the storage device 816 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 818 is coupled with the address/data bus 802, wherein the display device 818 is configured to display video and/or graphics. In an aspect, the display device 818 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 800 presented herein is an example computing environment in accordance with an aspect. However, the non-limiting example of the computer system 800 is not strictly limited to being a computer system. For example, an aspect provides that the computer system 800 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 9:
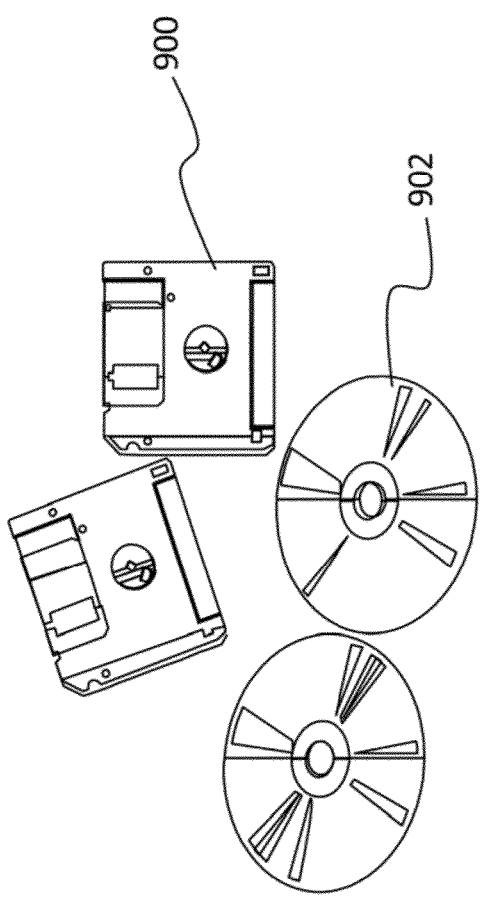
FIG. 9 is an illustration of a computer program product embodying the present invention.

An illustrative diagram of a computer program product (i.e., storage device) embodying the present invention is depicted in FIG. 9. The computer program product is depicted as floppy disk 900 or an optical disk 902 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" may be stored in the memory of a computer or on a computer-readable medium such as a floppy disk, a CD-ROM, and a flash drive. In either event, the instructions are encoded on a non-transitory computer-readable medium.

What is claimed is:

1. A cyber security system for digital artifact genetic modeling and forensic analysis, comprising:
   one or more processors and a memory, the memory having instructions encoded thereon such that upon execution of the instructions, the one or more processors perform operations of:
   receiving a plurality of digital artifacts, each digital artifact possessing features;
   extracting the features from the digital artifacts;
   classifying the features into descriptive genotype-phenotype structures, such that genotype features are those that carry inheritance information, and phenotype features are those that carry behavioral information; and
   determining a lineage, heredity, and provenance of the digital artifacts based on mapping of the genotype-phenotype structures.

2. The system of claim 1, wherein in extracting the features from digital artifacts, the system uses a spatial-temporal vocabulary tree to index a set of features and identify potential relationships between the features.

3. The system of claim 2, wherein in classifying the features into descriptive genotype-phenotype structures, the system identifies correlations between the extracted features and cluster correlated features into motifs.

4. The system of claim 3, wherein in determining a lineage, heredity, and provenance of the digital artifacts, the system further models relations between the digital artifacts as an artifact relation network (ARN), the ARN having nodes and links, such that the nodes represent the digital artifacts, annotated with genotype and phenotype feature vectors, and the links represent similarity relationships between the nodes.

5. The system of claim 4, wherein in determining a lineage, heredity, and provenance of the digital artifacts, the system further generates a hierarchical artifact network (HAN), the HAN having HAN clusters that provide a hierarchical organization of multiple, dependent relations between the digital artifacts, the HAN clusters having leaf nodes that represent digital artifacts and intermediate nodes that represent a degree of relatedness among clusters of digital artifacts.

6. The system of claim 5, wherein in determining a lineage, heredity, and provenance of the digital artifacts, the system further determines lineage between each pair of digital artifacts in the ARN by computing a Kullback-Leibler (KL) divergence of the digital artifacts to estimate an evolution transition, such that if the KL divergence is below a predetermined threshold, the pair of digital artifacts are determined to be of an established ARN lineage relation.

7. The system of claim 6, wherein in determining a lineage, heredity, and provenance of the digital artifacts, the system further determines heredity relations for each established ARN lineage relation by comparing common features of their respective HAN clusters to identify unique overlapping shared features.

8. The system of claim 7, wherein in determining a lineage, heredity, and provenance of the digital artifacts, the system further determines provenance by combing HAN clusters with the ARN lineage relations and heredity relations to estimate missing provenance values.

9. A computer implemented method for digital artifact genetic modeling and forensic analysis, comprising an act of causing a data processor to execute instructions stored on a non-transitory computer-readable medium such that upon execution, the data processor performs operations of:
   receiving a plurality of digital artifacts, each digital artifact possessing features;
   extracting the features from the digital artifacts;
   classifying the features into descriptive genotype-phenotype structures, such that genotype features are those that carry inheritance information, and phenotype features are those that carry behavioral information; and
   determining a lineage, heredity, and provenance of the digital artifacts based on mapping of the genotype-phenotype structures.

10. The method of claim 9, wherein in extracting the features from digital artifacts, the data processor uses a spatial-temporal vocabulary tree to index a set of features and identify potential relationships between the features.

11. The method of claim 10, wherein in classifying the features into descriptive genotype-phenotype structures, the data processor identifies correlations between the extracted features and cluster correlated features into motifs.

12. The method of claim 11, wherein in determining a lineage, heredity, and provenance of the digital artifacts, the data processor further models relations between the digital artifacts as an artifact relation network (ARN), the ARN having nodes and links, such that the nodes represent the digital artifacts, annotated with genotype and phenotype feature vectors, and the links represent similarity relationships between the nodes.

13. The method of claim 12, wherein in determining a lineage, heredity, and provenance of the digital artifacts, the data processor further generates a hierarchical artifact network (HAN), the HAN having HAN clusters that provide a hierarchical organization of multiple, dependent relations between the digital artifacts, the HAN clusters having leaf nodes that represent digital artifacts and intermediate nodes that represent a degree of relatedness among clusters of digital artifacts.

14. The method of claim 13, wherein in determining a lineage, heredity, and provenance of the digital artifacts, the data processor further determines lineage between each pair of digital artifacts in the ARN by computing a Kullback-Leibler (KL) divergence of the digital artifacts to estimate an evolution transition, such that if the KL divergence is below a predetermined threshold, the pair of digital artifacts are determined to be of an established ARN lineage relation.

15. The method of claim 14, wherein in determining a lineage, heredity, and provenance of the digital artifacts, the data processor further determines heredity relations for each established ARN lineage relation by comparing common features of their respective HAN clusters to identify unique overlapping shared features.

16. The method of claim 15, wherein in determining a lineage, heredity, and provenance of the digital artifacts, the data processor further determines provenance by combing HAN clusters with the ARN lineage relations and heredity relations to estimate missing provenance values.

17. A computer program product for digital artifact genetic modeling and forensic analysis, the computer program product comprising computer-readable instructions stored on a non-transitory computer-readable medium that are executable by a computer having a processor for causing the processor to perform operations of:
receiving a plurality of digital artifacts, each digital artifact possessing features;
extracting the features from the digital artifacts;
classifying the features into descriptive genotype-phenotype structures, such that genotype features are those that carry inheritance information, and phenotype features are those that carry behavioral information; and
determining a lineage, heredity, and provenance of the digital artifacts based on mapping of the genotype-phenotype structures.

18. The computer program product of claim 17, wherein in extracting the features from digital artifacts, the computer program product further includes instructions for causing the processor to use a spatial-temporal vocabulary tree to index a set of features and identify potential relationships between the features.

19. The system of claim 18, wherein in classifying the features into descriptive genotype-phenotype structures, the computer program product further includes instructions for causing the processor to identify correlations between the extracted features and cluster correlated features into motifs.

20. The system of claim 19, wherein in determining a lineage, heredity, and provenance of the digital artifacts, the computer program product further includes instructions for causing the processor to model relations between the digital artifacts as an artifact relation network (ARN), the ARN having nodes and links, such that the nodes represent the digital artifacts, annotated with genotype and phenotype feature vectors, and the links represent similarity relationships between the nodes.

21. The system of claim 20, wherein in determining a lineage, heredity, and provenance of the digital artifacts, the computer program product further includes instructions for causing the processor to generate a hierarchical artifact network (HAN), the HAN having HAN clusters that provide a hierarchical organization of multiple, dependent relations between the digital artifacts, the HAN clusters having leaf nodes that represent digital artifacts and intermediate nodes that represent a degree of relatedness among clusters of digital artifacts.

22. The system of claim 21, wherein in determining a lineage, heredity, and provenance of the digital artifacts, the computer program product further includes instructions for causing the processor to determine lineage between each pair of digital artifacts in the ARN by computing a Kullback-Leibler (KL) divergence of the digital artifacts to estimate an evolution transition, such that if the KL divergence is below a predetermined threshold, the pair of digital artifacts are determined to be of an established ARN lineage relation.

23. The system of claim 22, wherein in determining a lineage, heredity, and provenance of the digital artifacts, the computer program product further includes instructions for causing the processor to determine heredity relations for each established ARN lineage relation by comparing common features of their respective HAN clusters to identify unique overlapping shared features.

24. The system of claim 23, wherein in determining a lineage, heredity, and provenance of the digital artifacts, the computer program product further includes instructions for causing the processor to determine provenance by combing HAN clusters with the ARN lineage relations and heredity relations to estimate missing provenance values.

25. The system of claim 1, wherein in determining a lineage, heredity, and provenance of the digital artifacts, the system further models relations between the digital artifacts as an artifact relation network (ARN), the ARN having nodes and links, such that the nodes represent the digital artifacts, annotated with genotype and phenotype feature vectors, and the links represent similarity relationships between the nodes, and the system further determines lineage between each pair of digital artifacts in the ARN by computing a Kullback-Leibler (KL) divergence of the digital artifacts to estimate an evolution transition, such that if the KL divergence is below a predetermined threshold, the pair of digital artifacts are determined to be of an established ARN lineage relation.

* * * * *